March 11, 1969 — P. E. SLAVIN — 3,432,657
X-RAY HELICAL SCANNING MEANS FOR DISPLAYING
AN IMAGE OF AN OBJECT WITHIN
THE BODY BEING SCANNED Filed July 6, 1965

INVENTOR.
PETER E. SLAVIN
BY Morse, Altman & Oates
ATTORNEYS

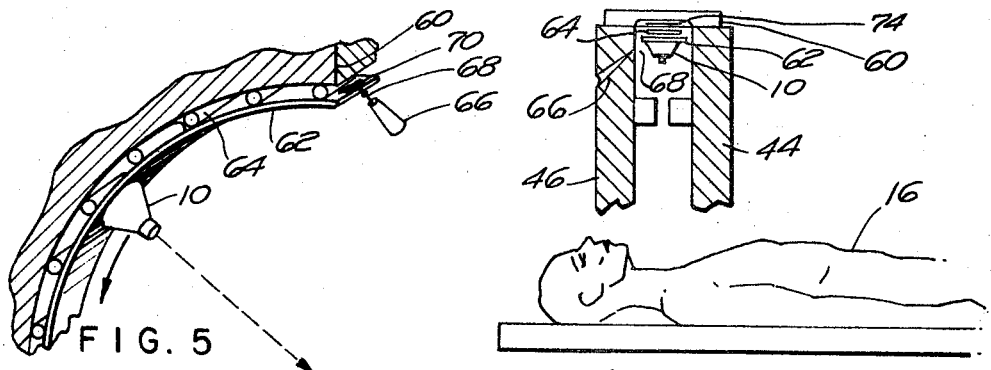
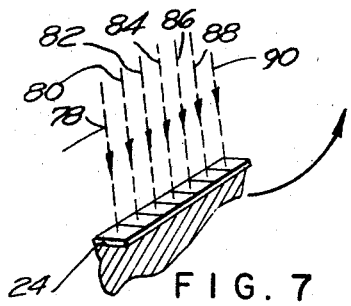
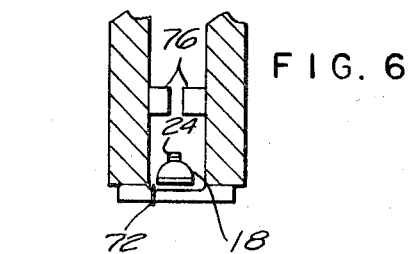
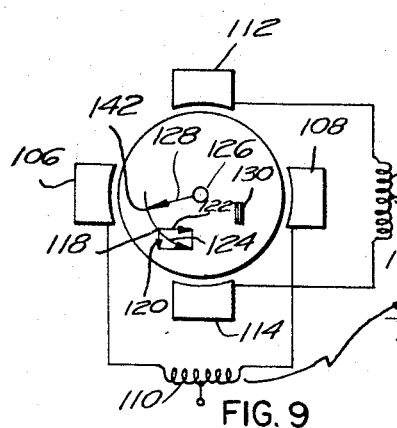
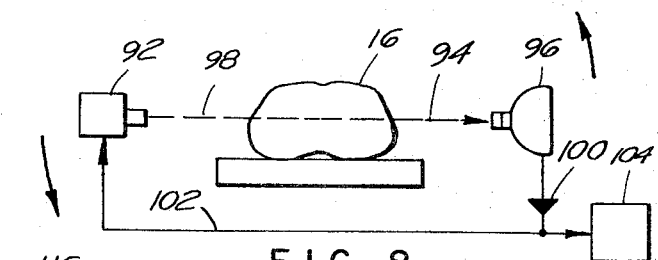
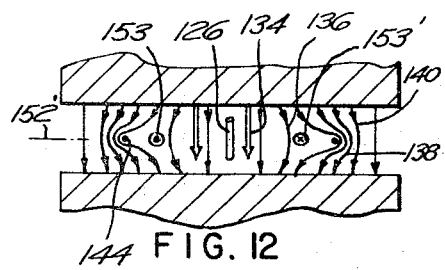
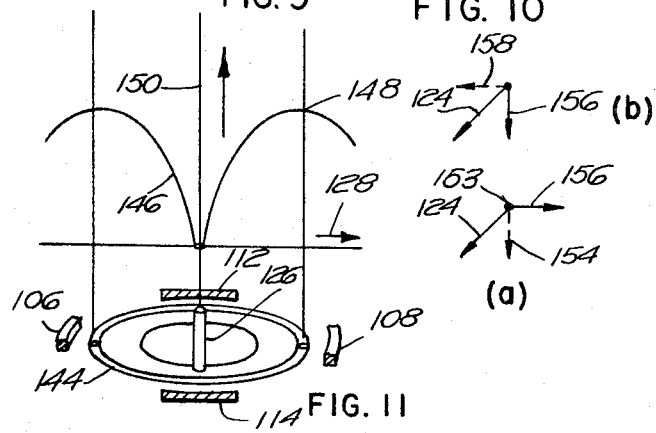
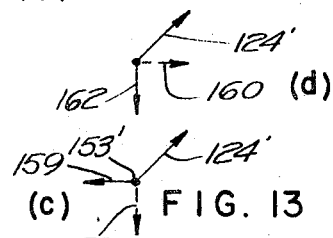
INVENTOR.
PETER E. SLAVIN

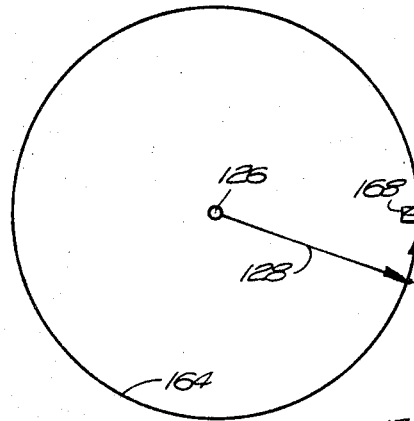
FIG. 14
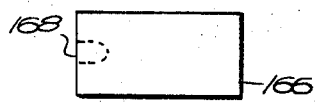
FIG. 15
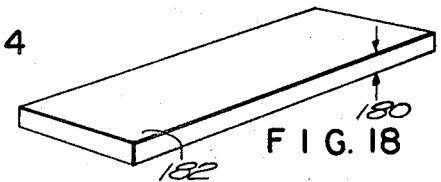
FIG. 18
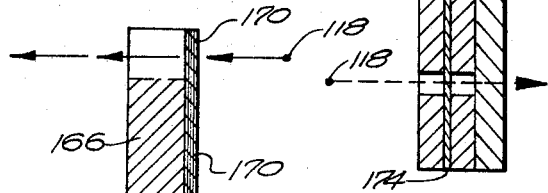
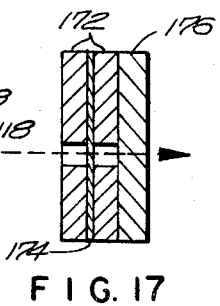
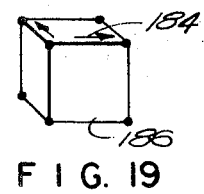
FIG. 19
FIG. 16    FIG. 17
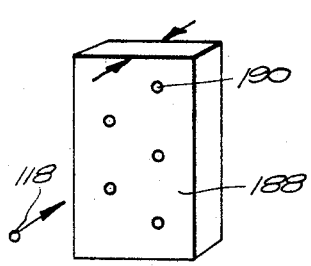
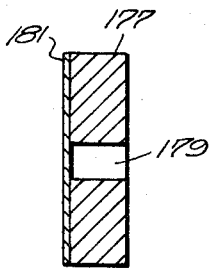
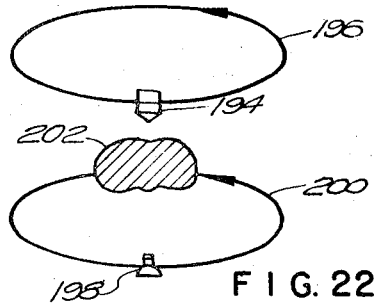
FIG. 22
FIG. 21    FIG. 20
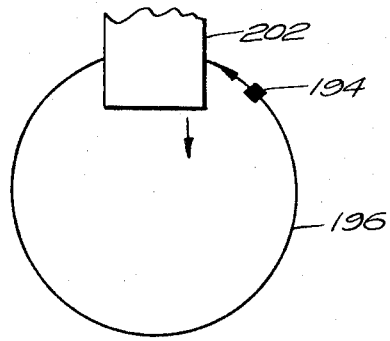
FIG. 23
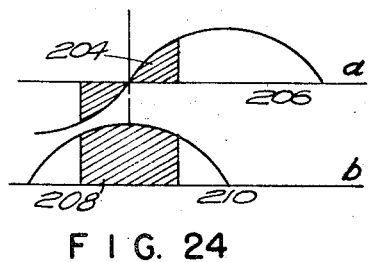
FIG. 24
INVENTOR.
PETER E. SLAVIN
BY
ATTORNEYS

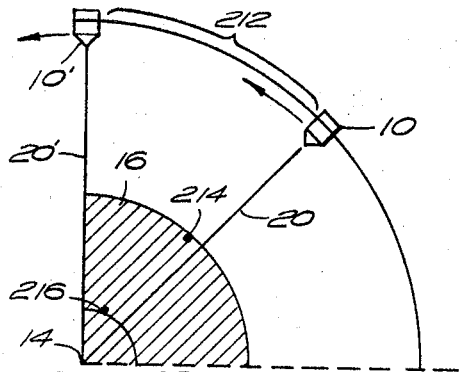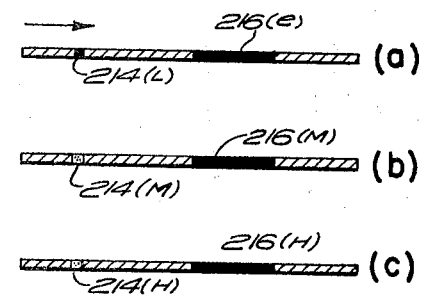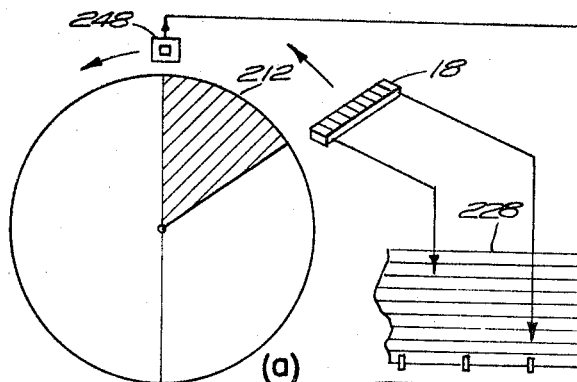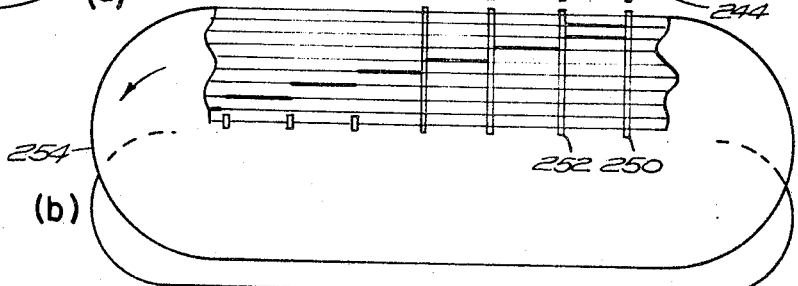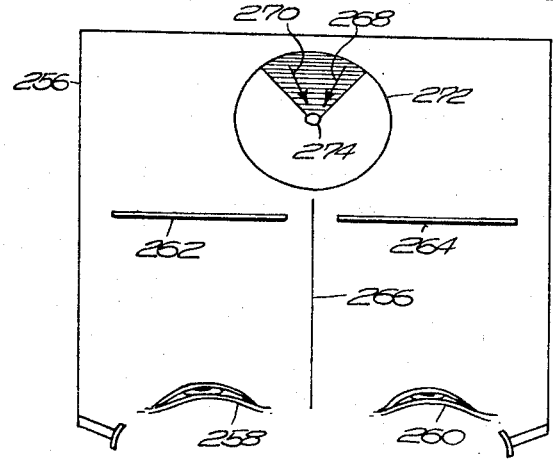

United States Patent Office 3,432,657
Patented Mar. 11, 1969

3,432,657
X-RAY HELICAL SCANNING MEANS FOR DISPLAYING AN IMAGE OF AN OBJECT WITHIN THE BODY BEING SCANNED
Peter Edmond Slavin, Winchester, Mass., assignor to Intelligent Instruments, Inc., Woburn, Mass., a corporation of Massachusetts
Filed July 6, 1965, Ser. No. 469,505
U.S. Cl. 250—53                                   17 Claims
Int. Cl. G01n 23/04

ABSTRACT OF THE DISCLOSURE

A stereoscopic image is obtained from an X-ray scanning instrument in which the patient is moved along the axis of a rotating X-ray source with an X-ray receiver located oppositely the source and rotating with it to generate a helical scanning motion with respect to the patient. The X-ray receiver generates electrical signals which are recorded on magnetic tape and the tape is employed to operate a stereo video system. A compact particle accelerator employing a revolving electrical field is provided for producing highly directional and monochromatic X-ray beams.

---

Figure 1:
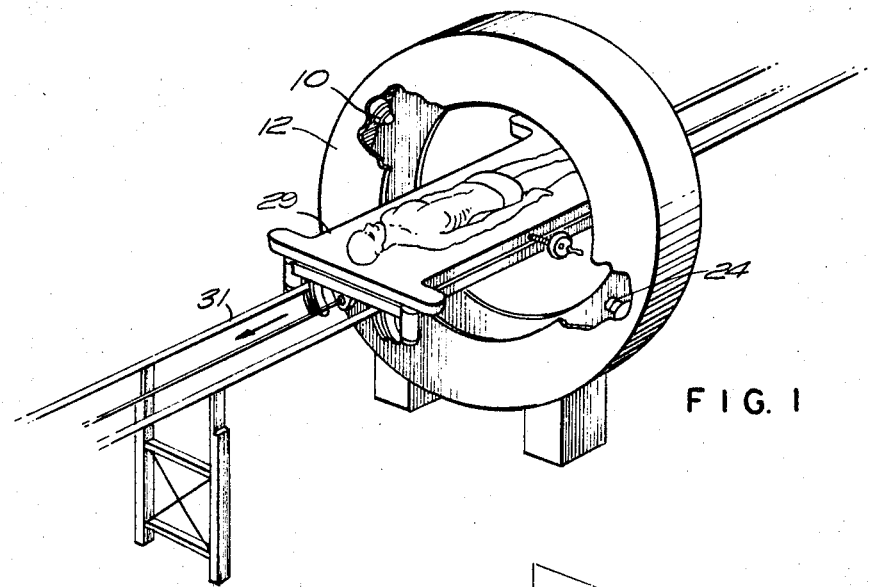

This invention relates generally to X-ray equipment and to the use of X-rays to yield information, usually pictorial in content, on the internal structure of objects such as the absorption structure of objects within a human body for example. More particularly this invention is directed towards improved methods and apparatus for yielding more precise information to the Examiner, presented in a more graphic manner, more suitable for control by the Examiner, with less of a radioactive dose to the patient, and with a lower cost of storing this information.

Present X-ray methods and equipment in the medical field, and usually in the non-medical field also, "flood" the body to be examined with X-rays from one direction. The rays then pass through the body, are partly absorbed, and finally impinge on a film. This film after "developing" yields an image (the shadowgraph) which is related to the internal structure—viz the bones, the organs, etc. In recent years some work has been done with replacement of the film by a fluorescing screen (image intensifier), which is then scanned by a television camera to give a television type image in place of the film image.

This invention differs from equipment and techniques presently in use in that it embodies:

(1) A transmitter producing a fine beam or ribbon of X-rays which transmitter is adapted to move in a circular or elliptical path as the body under examination moves along a straight line along the axis of the rotating transmitter.

(2) A receptor for the X-rays which emerge from the body, this receptor rotating directly opposite to the transmitter, and producing an electrical signal (or signals) which is recorded on magnetic tape.

(3) A magnetic tape storage system having a more economical (less bandwidth) specification than that of the television scheme.

(4) A visual presentation which has three major characteristics; namely, better resolution of fine detail, and particularly that of the scanning centre, ability to select the viewing angle from any one of eight sectors of one complete circumference, and ability to give depth (stereoscopic) to the image.

While the transmitter in one embodiment is a radioactive isotope, the invention also includes an improvement in the form of a new kind of small (tube) particle accelerator which yields energies which can be controlled in the 20 kev. to 200 kev. (thousands of electron volts)

range. This tube accelerator embodies a revolving electric field for acceleration and a second (static) electric field for horizontal stability, and employs operating principles different from the large-scale (megavolt) accelerators such as cyclotrons.

Accordingly this invention then also relates to the production of X-rays, especially monochromatic (one energy) and directional beams of such rays.

In the non-medical field there are X-ray beams which are slowly moved around a material at the centre, to give information on structure of their crystals. Such examination method is different from the present invention in that:

(a) The interest is not in an absorption image, but in those angles between transmitter and receptor where the crystal structure gives strong "lines" of X-rays in phase, and (b) The information rate is very slow, and is usually recorded manually.

Accordingly, it is an object of this invention to provide means to obtain, store and manipulate the information on a body's X-ray absorption in such a manner as to be able to select direction of view, to select a fraction of the body's cross-section for special examination, and to be able to command a radiographic image in depth.

It is a further object to provide means to store this information on tape in the most economical manner, and to be able to compare this electrical picture with a similar electrical picture (i.e. subtraction), and to be able to produce an accurate and detailed visual picture for as long a time as required by the examiner.

Yet another object is to provide a small particle accelerator, of low energy level (100 kev.), low cost, and low power consumption.

Yet a further object is to provide means for the efficient conversion of these 100 kev. particle energies into X-rays of a known energy (frequency) and direction; and with the intensity liable to control.

And another object is to provide a system for producing the maximum information on the body examined with a minimum of radioactive dosage (roentgens) to that body.

Figure 2:
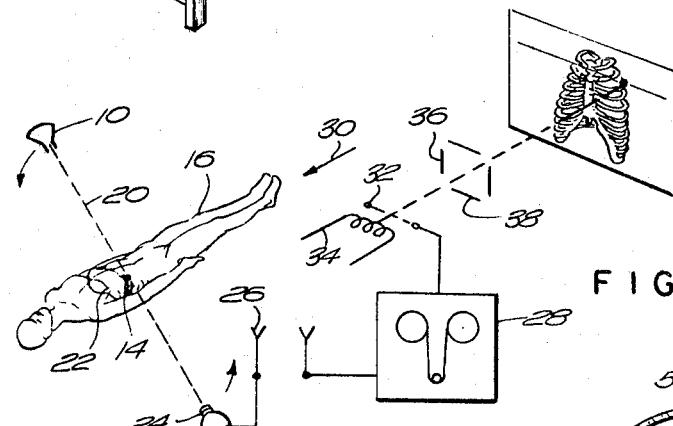
Figure 3:
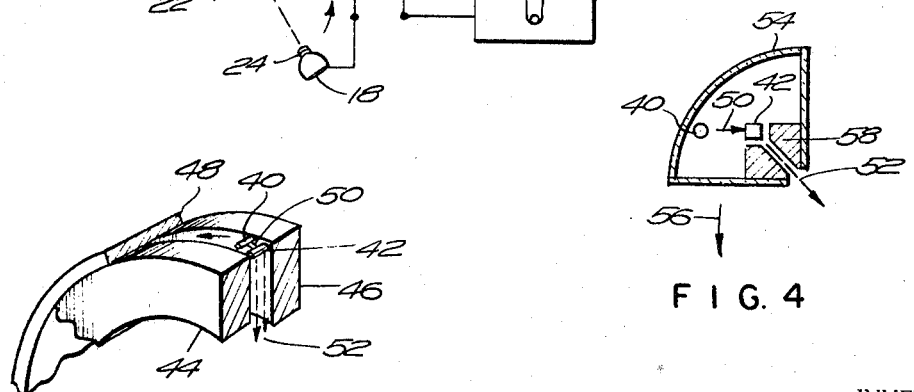
Figure 4:
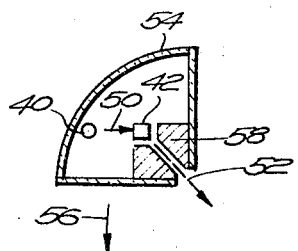

In the drawings:

FIG. 1 is a view in perspective of an X-ray scanning apparatus made according to the invention, FIG. 2 is a view in perspective, somewhat schematic of the system shown in FIG. 1, FIG. 3 is a fragmentary perspective view showing details in the construction of the transmitter and its support, FIG. 4 is a sectional side elevation of the isotope transmitter of FIG. 3, FIG. 5 is a fragmentary perspective view partly broken away showing details in the construction of the rotor, FIG. 6 is a fragmentary sectional side view of the rotor assembly, FIG. 7 is a fragmentary perspective view of the sensitive elements in the receptor, FIG. 8 is a schematic diagram of a modification of the invention, FIG. 9 is a schematic diagram of a particle accelerator as employed in the FIG. 8 modification, FIG. 10 is a phase diagram for the coils of FIG. 9, FIG. 11 is a combination perspective view of the accelerator and a pilot of the electrical potential across the maximum diameter of the orbit, FIG. 12 is a sectional side elevation of the accelerator, FIGS. 13a–c are vector diagrams for particles in the accelerator, FIG. 14 is a top plan view somewhat schematic of the accelerator, FIG. 15 is a side elevation of the target shown in FIG. 14, FIGS. 16 and 17 are sectional views of two modified targets for use in the accelerator, FIG. 18 is a perspective view of another modified target, FIG. 19 is a perspective view of the crystal lattice in the FIG. 18 embodiment, FIG. 20 is a sectional end elevation of still another modified target, FIG. 21 is a perspective view of yet another modified target, FIG. 22 is a perspective view of a modification of the invention with transmitter and receptor rotating in separate coaxial orbits, FIG. 23 is schematic plan view of the FIG. 22 embodiment, FIGS. 24a and b are waveform diagrams of the deflecting voltages for the C.R.T. used in the FIG. 22 embodiment, FIG. 25 is a schematic diagram illustrating how effective magnification is obtained with the invention of FIG. 1, FIGS. 26a, b and c are views showing the different images produced from the FIG. 25 arrangement, FIGS. 27a and b are curves showing the response of filters used in the system, FIG. 28a is a schematic diagram of an arrangement for storing information from the X-ray unit onto magnetic tape, FIG. 28b shows a modified tape for use with the FIG. 28a system, and FIG. 29 is a more or less schematic plan view of a system for producing a stereo image from the X-ray apparatus.

There follows a detailed explanation of the construction and operation of this invention:

In FIGS. 1–7 there is given the main elements of this system. An X-ray transmitter 10 is shown mounted on a rotor 12 to revolve about a center 14 which is within a body 16 to be examined. An X-ray receptor 18 is mounted to the rotor 12 diametrically opposite to the transmitter 10. A beam of X-rays 20, which may also be parallel beams in a "ribbon," passes from the transmitter 10, through the body 16 at cross-section 22, and what is left after absorption then goes to the receptor 18. The X-ray energy is converted by the device at 24 into an electrical signal. The device 24 may be a scintillation material (as NaI) with a photo-multiplier, or a direct convertor (as a p-n junction), or a mosaic such that the ribbon of X-rays is resolved into, say, seven electrical signals. The signal or signals then modulate radio frequency (R.F.), and are passed via an antennae 26 to a tape recorder 28. This R.F. link is needed as the rotating receptor element and should not rely upon a commutator to pass on its signal s to the fixed recording apparatus.

As the transmitter and receptor revolve, the central body 16 such as a human patient lying on a dolly 29 slowly moves axially, as shown by arrow 30 along tracks 31. The dolly is adapted to be adjusted laterally and vertically to position the area of interest close to the axis. If we assume a ribbon of seven beams each 0.010" diameter, then the axial feed rate is 0.070" per revolution of the transmitter-receptor pair. If this revolution period is from 20 to 50 ms., then the body movement is about two inches per second. The scanning beam (or ribbon) generates a helix with relation to the body.

The information rate on each beam element then corresponds to the bandwidth needed for the image intensifier—TV camera system; where the complete image must be scanned in a fraction of a second. This means a high bandwidth of about one mc. s for equivalent resolution. Since each system gives thousands of "records" each year tape cost is a principal economic factor, and bandwidth is the major reason for high tape cost. The length of tape per record will be closely equal for these two systems as the heilcal or circular scan is in action longer; but the TV camera system has to have the tape run up to a higher speed (say 120 in./sec.) before recording starts.

In the case of a moving organ such as the heart, the effects of the old and this new system differ. In the old system the outline would be a trifle blurred owing to movement over a fraction of a second. In this new system the outline is "traversed" in one-tenth the time, so it will be sharp, but have an axial component bent in the direction of motion.

FIG. 2 shows a signal going to the grid 32 of a cathode ray oscilloscope—smilar to a TV receiver tube. The intensity of an electron beam gun 34 is modulated by this signal, with horizontal and vertical deflection signals applied to plates 36 and 38. The horizontal deflection is in synchronism with the rotation of the beam, and its length corresponds to a 45° arc of this circle. The vertical deflection is in synchronism with the axial movement of the body 16.

In FIG. 3 the transmitter elements, which in this embodiment are a radio-active isotope 40 and a crystal 42, are shown between spaced walls 44 and 46. These walls of steel provide a radiation shield in the horizontal direction, and also support tracks or races 48 on which the transmitter and receptor run. The gamma radiation 50 from the isotope 40 is absorbed (in part) by the crystal 42, which then re-radiates a characteristic (Bragg plane) X-ray wavelength in a certain direction 52 towards the body 16. These X-rays do not form a fine beam, but by use of collimating walls they are eventually narrowed to such a beam.

In FIG. 4 there is given a side section through this transmitter, with the isotope 40 and the crystal 42. The entire small assembly in a case 54 is moving in the direction indicated by the arrow 56. Absorbing material 58 collimates the X-rays in the plane of the beam.

For resolution of the order of 0.01", the beam response will approach 10,000 cls. Then, keeping the statistical (time) variation of decay below noise level, and assuming a minimum of energy focusing at the crystal, then the disintegrations per second should be about $10^{12}$. An isotope such as cerium 184 having the correct energy levels and a convenient life (290 days for cerium) will give this rate for a fraction of a milligram. Isotope cost would likely be less than the cost of power consumed by the usual X-ray transmitter of today.

In FIG. 5 there is shown the relationship between a fixed outer shell 60 and a rotatable inner ring 62. This inner ring carries the transmitter 10 and the receptor 18, and moves on bearings 64 between itself and the shell. These bearings may be ball or roller type. At high revolution rates the force corresponding to centrifugal acceleration may be of the order of 20,000 lbs. The body to be examined lies at the center of the ring 62, so that a driving motor shaft would involve extending the ring to a drum and yet preserving the shielding. A better solution is to drive the ring by using it as part of a linear induction motor, or by the use of the ring as a turbine. This latter arrangement is shown in FIG. 5, where a nozzle 66 pushes a jet of gas 68 (such as compressed air) against blades 70. It would take a few seconds to get up to speed, two seconds for the X-ray scan; and a few seconds deceleration with negative power (braking).

FIG. 6 gives a cross-section of the sidewalls 44 and 46, the shell or end wall 60, and the moving ring assembly 62. The transmitter 10 is directly opposite to the receptor 18; both are a part of the ring assembly; ideally their masses balance. The propelling nozzle 66 is shown coming through the side wall 46, with the gas jet 68 pushing the ring. The rotation rate during scan need not be exact, since at 45° intervals a synchronism pulse is placed with the electrical signal out. This pulse may be generated by photoelectric or magnetic proximity of the receptor device 24 to fixed markers such as 72. The receptor converts the X-ray signal into modulated radio frequency which is then broadcast to a fixed ring antennae at 74. This telemetry link is relatively simple, as the distance of the radiated signal is of the order of one (1) inch; and the radiation shielding prevents any R.F. interference elsewhere. Shoulders 76 on the side walls give additional horizontal collimation.

FIG. 7 shows a ribbon of X-rays arriving at the sensitive surface 24. Such a ribbon is basically seven beams (78 to 90) spaced about 0.01″ apart. The surface 24 is a mosaic, each element of which converts one of the ribbon beams into an electrical signal. There are two advantages to a ribbon of seven beams as opposed to one beam. First, it takes less time to examine a certain axial length. Secondly, each beam can be assigned one channel of an eight channel magnetic tape, resulting in storage economy and ease of manipulation (as will be shown).

It should be noted that the mosaic elements can be of high efficiency; scintillation type as sodium-iodide has a relative (quanta) efficiency of about 2.0 Its response is reasonably flat over a wide energy range, its response time is in nanoseconds ($10^{-9}$), and its output is linear. In the case of the image intensifier the image "dot" has to be stored for some milliseconds (say, as charge on the image plate of the vidicon camera) before it is translated into an electrical signal. This means a loss of sensitivity per X-ray quantum, and a non-linearity in the camera chain known as the "gamma."

In FIG. 8 there is shown a means for reduction of the dosage absorbed by the body 16 still further. This system diagram assumes a transmitter 92 of small mass which is essentially a particle accelerator and a target. Such a transmitter may be controlled both for intensity and energy level (in steps) of the emerging X-ray beam. While it would reduce the radioactive shielding needed, the mass of the (moving) transmitter would likely increase. This system will be of special use for cases where dosage is all-important.

In this system emerging (unabsorbed) X-rays 94 are held at a minimum value, just above the noise level in a receptor 96. The action is as follows: let us suppose that at a certain instant of the scan a very small fraction of the X-rays coming in at 98 is absorbed by the body 16. There the X-ray intensity out 94 will rise and the electrical signal out of receptor 96 and amplifier 100 will also increase. This increase is then fed back negatively to the transmitter via lead 102, causing the transmitter to decrease its particle and X-ray density. Then, since body 16 absorbs the same fraction of a lesser incident X-ray intensity, the dosage rate is reduced. At the same time the "error" signal which represents this absorption is sent to a recorder 104. In essence this is a regulator servo loop. Even if the frequency response of the "loop" is limited to 100 c.p.s. there should be a dosage reduction of an order of magnitude.

In FIG. 9 there is shown a schematic diagram of some of the essential elements of a very small particle accelerator. The energy levels desired are low by nuclear standards; 0.1 to 0.3 mev., or less. Pole pieces 106 and 108 produce an electrical field between them in an evacuated envelope owing to the alternating voltage on winding 110. Another pair of poles 112 and 114 yield a second field in space quadrature to the first, and driven by winding 116. The voltages on these windings are in time quadrature, so that the net result is an electrical field which rotates in accord with Ewlers law: $e^{j\theta}=\cos\theta+j\sin\theta$. If such a field be applied to deflecting a charged particle (in place of accelerating as here) the resultant path would be a circle (such as Lissajous pattern on a C.R.T.).

In FIG. 9 a charged particle 118 is subject to accelerating forces 120 and 122, which combine to give a resultant force 124. This force 124 is tangent to a circle on which the particle is travelling, the circular motion arising from a magnetic field at right angles to the plane of FIG. 9.

A pin 126 is at the orbit centre, and radius 128 of the particle path is in proportion to the particle's velocity. For ease of stabilizing the orbit the particles are "launched" from 130 rather than start at almost zero velocity at the centre 126. At any given instant there will be a large number of particles travelling on orbits of different diameters, but (since the periods are closely equal) travelling in phase with the revolving electric field. In this respect this is the analogue of the revolving magnetic field and rotor of a motor. At typical conditions the field frequency will be 3 cm./s. and the orbit diameter for a proton at the 2 kev. level about 2 inches. In FIG. 10 it may be seen that the wave for the winding 110 lagging 45° on its peak, i.e. at line 132 gives field 122. Sine wave for the winding 116, leading 45°, gives field 120. The particle may then accelerate or pick-up an energy of 100 volts per orbit, and after 1000 orbits, be at the 100 kev. energy level. Relativity effects at this energy level for negligible; an addition of 0.1% to the mass of a proton, for example. The electric pole faces are curved outward slightly to take care of this effect, and to increase stability. Such systems of charged particles moving in circular tracks are not uncommon. In nuclear physics the diameter of these tracks is at least ten times what this invention proposes; and the energies sought are in mev. (millions of electron-volts) rather than in a fraction of one mev. Further, as will be pointed out, the accelerating and control fields are different.

Any such system has three main "stability" problems:

(1) Phase stability; the ability to bring a particle a bit behind or ahead of the rest of the pack into exact synchronism.

(2) Vertical stability; ensures that a particle vertically off the plane of rotation is subject to a restoring force. It is important that the vertical limits of the track be kept close together, as these limits define the gap in a magnetic field.

(3) Horizontal stability; the centre of the circular track should not drift as the particle spirals outward.

In this invention there are four (4) fields; they are (with their function):

(F1) The alternating electric field (of FIG. 9) for accelerating the particles.

(F2) The direct (D.C.) electric field (of FIG. 11) for horizontal stability and limiting the track diameter.

(F3) A direct magnetic field 134 of FIG. 12 for giving the deflecting force to the particle to keep it on a circular track.

(F4) A changing magnetic field 136, 138 and 140 of FIG. 12 to give vertical stability.

While there are small interactions between these fields (for one, an energy transfer between the alternating electric and magnetic fields), essentially the effect of the particle can be taken one field at a time.

First, consider the accelerating field of FIG. 9 in relation to phase stability. Let the particle shown at 118 be actually at point 142, i.e. be a bit behind. It is then apparent that the accelerating force vector 124 at this instant, when placed on 142, will not be a true tangent; but will point inwards by a few degrees. That is, the slow particle at 142 will be pushed in a bit to a smaller radius, i.e. to a lower velocity orbit; and as a result will tend to "catch up." In like manner a leading particle will be pushed a bit outwards, and this will enter a higher velocity orbit where it will tend to fall behind until it is in exact synchronism.

In FIG. 11 there is shown a perspective view of the orbit, and the electric potential across the maximum diameter of that orbit. Pin 126 is at the orbit centre, and it has a large electric field (potential difference) between itself and a ring 144. The shape of this field is given by lines 146; where the maximum 148 is reached close to the ring diameter. The vector 150 is field potential and 128 is radius. This field is in such a direction that the particle is repulsed from the central pin. It is then evident that if the orbit (circle) "slips" in a horizontal direction, the central push outwards is such as to lengthen the shortened radius on one side, i.e. to restore the orbit centre to the true centre, the pin 126. If the ring 144 potential be kept greater than the accelerating field D.C. potential (at 112, 106, 114 and 108) the field maxima will be close to 148. From stability calculations it can be shown that the ratio of the maximum orbit radius to minimum should not be excessive, so that (typically) this ratio will be 10 times and the particle will be "launched" with an energy of a few kev.

In FIG. 12 there is given a side view of the plane of orbit 152, with the centre pin 126, ring 144 and two positions of a particle (153, 153'). These are shown between the poles of a magnet which gives the direct field 134 and the changing field 136, 138 and 140. The direct field is of uniform strength across the orbit diameter, while the changing field is bent as shown such that its strength inside the ring 144 is greatly reduced. This is due to the fact that the ring has induced in it a current which gives an opposing field within the ring 144 (though of course the direct field of 134 does not induce any such opposing field).

FIG. 13a applies to a particle on the orbit plane 152 at 153 and FIG. 13b is for a particle a bit above this plane. In (a) it is seen that the particle motion 124 (out of the page) and the field vector 154 are in such relative directions that the (motor) force vector 156 is towards the centre. At (b) there is given the same particle motion, with a magnetic field component now in direction 158. It is then seen, by rotating the vectors 156 and 154 of (a) through 90°, that a force vector 156 is now towards the orbit plane, i.e. downwards. This is then in a direction to restore the particle to the correct plane. For a position below this plane the correcting force will be upwards since the changing field component runs the opposite way.

In (c) the particle is at 153', i.e. moving "into the paper." Then a field vector 158 and motion 124' evidently give the usual force 159 towards centre. The FIGURE 13(d) gives motion 124', field vector 160 and correcting force vector 162; derived from the vector set of (c) just as (b) was from (a). It will be noted that this changing field is only a fraction of the strength of the initial direct field 134. If this direct field 134 has one polarity and the particles one charge polarity, then this changing field must change in one direction only (that of FIGURE 12 for example) for the length of the "scan."

This small particle accelerator is, of course, nothing like the megavolt units which weigh many tons—such as the cyclotron, betatron, synchrotron, etc. The difference lies not only in size but in principle of operation, in particular:

(1) The central pin giving a (repulsing) electric field.

(2) The ring for shaping the peak electric field and the alternating magnetic field.

(3) The use of a revolving electric vector for acceleration. For example, a cyclotron has a deflecting magnetic field, but it does not have the three features above; it makes use of a pulsed "kik" between two plates to boost the electron velocity.

A betatron uses a varying magnetic (cross) field for acceleration; it has poor horizontal and vertical focusing ability, and the field has to build up to high peak strengths over an interval of very many particle orbits.

A synchrotron, despite "banking" of the field, has mediocre positional stability, and it has poor phase stability—the accelerating frequency has to be "synced" (increasing R.F.) very exactly. Alternating gradients give good focus but introduce synchronizing problems.

Before going on to discuss the manner in which these rotating particles are turned into X-rays, let us review the normal method as used today. In this method the electrons are linearly accelerated and caused to strike a thick target, often of tungsten material. These electrons arrive at the target with a small distribution of energy (due to variation at the start of acceleration) and direction (due to focus method). The target is of a high atomic number so as to have a large cross-section; it is thick so that none of the electron energy will be lost by passing through the target. The efficiency of such a conversion is rather low, say 3% in going from electrical energy to X-ray quanta. This involves high loss and high heating in the target material, so that this material must have a high thermal conductivity and an external coolant (as water) supplied. For example, 100 kv. energy in the linear beam and 100 ma. means 10 kilowatts of power dissipation for a fraction of a second.

The ray energies (wavelengths) and the direction of these rays depend primarily upon the change of momentum vectors of the electrons as they are slowed down or stopped by the target atoms. This stopping process is mostly due to these atom's electrons. If the beam electron comes close enough to a target electron and if the beam electron has sufficient energy (velocity) so that its coupling period is less than that for the target wave function, then such electron is decelerated, i.e. a vector. This then appears as electromagnetic radiation, i.e. X-ray. Part of this radiation will be associated with an energy "jump," such as a shaft of the electrons on the K shell. There are thus peaks in the radiation spectrum. Another part of this radiation will be absorbed in surrounding atoms of this thick target material, and re-emitted after some loss.

The target material itself has no particular alignment of its atoms nor of its inter-atom exchange forces. In brief, then, the path of any beam electron in the target will be a zig-zag one, involving even (a few) reversal of momentum vector. Thus, the radiation will be of a very broad spectrum, with no sharp peaks, and having a strength (intensity in quanta) in any direction only weakly related to the sine of the angle of incidence. The strength of a particular frequency in a particular direction may be increased by the use of a crystal (as calcite) which gives phase reinforcing in that direction; but of course this is not done in present medical X-ray practice, where a "flood" in a very broad direction (cone) is used.

As an introduction to several features of the present X-ray transmitter a very basic sketch is given in FIG. 14. The electron 118 is travelling on a critical orbit 164. This is the orbit at which the ring 144 and field 138 of FIG. 12 act such that the radius 128 no longer increases, or increases very slowly. Now the energy and velocity vector on this orbit are very well defined, principally by the equation: $P=erB$. (P is momentum, $e$ is charge, $r$ is radius, and B is perpendicular magnetic field.) A thin peak 166 is the target supporting structure, and 168 (FIG. 15) is the target. Several interesting comments may be made in connection with the target.

(1) The target 168 may be extremely thin. The base material 166 will support it—and may act as a heat sink.

(2) Most electrons will go through this target, but there will be no loss of efficiency as such electrons will simply come around again in a very short time. For sake of illustration let us assume 10 ma. of electron current travelling in a "bunch" once around the orbit each 0.1 microsecond. Perhaps only one-thousandth of this current i.e. 10 na. will be "captured" in the target at any one orbit; but this will be more than enough to give a "dot" (pulse) of X-ray if it is highly directional (i.e. towards the receiver).

(3) The directivity can be made very high because of the lack of scatter of the bombarding electrons inside the target, and much less double emission. Further directivity can be had by an orientation of the target material; either by introduction of strain and/or magnetic axes.

(4) The X-ray receiver (for example, a mosaic of

NaI.) is more sensitive than film, or film preceded by an image intensifier. Its decay time may be matched to the orbit period, and there is much less problem of cross leakage than in a scintillation screen type of intensifier.

(5) The cooling problem no longer exists owing to the high directional efficiency, high conversion efficiency (to useful spectrum), and the sensitivity of the receiver. It will be noted that the target dissipates energy only for a few degrees of each orbit. The heat energy will be only a few watts by a few seconds; typically less than 10 joules.

(6) The electrons which have their velocity vector "bent" by the target, but go through, will in general fall into an orbit of less diameter and resume accelerating out to the critical radius once again. The spiral current of the beam is only about 10 na., although they gather in a 10 ma. "bunch" at the critical radius. The size of the target "spot" bombarded depends upon the coulomb repulsion between the orbiting electrons, and upon cooling characteristics. Typically the spot is .030" in diameter with the notch 168 about twice this diameter (the notch being in the base material only).

In FIG. 16 there is given a section of one possible target; a plating 170 of a gold alloy on top of a thin aluminum heat sink 166. Gold is desirable as a target in that it has high thermal conductivity and a "K" characteristic radiation close to 80.7 kv. It has a specific gravity of 19.3 (equal to tungsten) and atomic number 79, so it has good capture cross-section. Its absorption peaks at 8.8 (rel.) at 0.146 A. (1 A. is $10^{-10}$ m.). The plating thickness cannot approach the bombarding electron equivalent wavelengths (a fraction of one Angstrom), but a few microinches (say 1000 A.) will reduce scatter to the point where the main radiation lobes are well-defined. The plating is not a true alloy, but the use of a nickel plating electrode as well as gold will strengthen the plated layer, and give it some small degree of orientation.

The stopping cross-section of gold at 200 kev. is about $40 \times 10^{-15}$ ev. cm.$^2$. A 100 A. thickness will have about $10^{12}$ to $10^{13}$ atoms and give a cross-section of at least $10^{-3}$ cm. at 100 kev. Thus a particular electron may orbit 800 times in process of accelerating, and 500 times through the target before capture.

Gold does have a low melting point (1600° C.), and so a minute amount will melt at each contact with the orbiting electron bunch. This will simply anneal after the bunch has gone through, although the notch plating may have to be renewed at weekly intervals. This notch is formed by plating first and then etching away the base material (aluminum).

There is another possible target based upon the radiation from gold. This is shown in FIG. 17 where there is a notched structure similar to FIGS. 15 and 16 and fabricated with an aluminum support 172 for a stratum 174 of gold. A layer 176 either a silicon or calcite crystal completes the target. It will be understood that the aluminum provides a support for the gold and acts as a heat sink for the target while the crystal 176 provides a filtering medium for the generated X-rays.

There is another sort of target which yields a broad spectrum of energy combined with very high directivity. That is the use of a material with oriented grain structure, such as certain 50% nickel-50% iron alloys rolled down to strip as low as 0.0001 in. thick. This thickness 180 is shown for magnetic strip 182 in FIG. 18. Such strips have a low coercive force (typical 0.1 oersted) and a remanent flux which can be 99% of the saturation flux. There may be several "easy" directions of magnetization, but the dominant one will lie along an edge 184 of a cube 186 in FIG. 19. The strip may be etched to give a notch less than 0.0001 in., and it may be supported on a thin layer of material having a low (electron) capture cross-section.

The essential notion here is that the electron momentum (energy) change does not entirely depend upon electron initial velocity, but also how this energy couples in to the spin axes of the target electrons. These axes are best defined in the material above, owing to the line-up of the magnetic exchange forces. At the same time the material must be kept below its Curie temperature (about 500° C.) or the orientation effects will be lost. Note that this orientation does not rely upon the electron position, which of course, cannot be defined to better than the usual Planck number ($h/mo^v$). It is thus possible to modulate the direction of energy in a particle direction by the use of magnetic alignment of the crystal structure. Polarizing effects are also possible as the magnetizing field is reversed.

In FIG. 20 there is shown another sandwich type of target. In this embodiment a relatively thick stratum 177 of gold which is notched at 179 serves as a support for a relatively thin stratum 181 of molybdenum. The notch may be eliminated for single pass capture filtering effect due to the difference of absorption edges of molybdenum and gold.

Finally in FIG. 21 there is shown another type of target in which uranium atoms 190 are dispersed through a suitable matrix 188 such as glass or a crystal. The use of a crystal matrix makes possible the selection of the proper beam direction by rotation of the crystal. Different energy levels may be selected according to the selected angle. A glass matrix on the other hand provides no such crystalline filtering effects insofar as the glass is a series of long polymer chains and cross chains.

Another variation in the target construction is a gold stratum on a polyurethane support which would have low absorbtion and stopping power. Also atoms of gold may be suspended in a glass matrix in a manner similar to FIG. 21.

To review the target characteristics: the gold notch and aluminum heat sink of FIG. 16 provides good directivity, narrow spectrum, and good thermal characteristics although there is a possibility of gradual gold loss through sputtering. The addition of a silicon crystal in FIG. 17 further narrows the spectrum by filtering the X-rays. The gold and molybdenum sandwich of FIG. 20 provides excellent thermal characteristics but displays relatively low efficiency at the medical X-ray spectrum. Otherwise its characteristics are similar to the target of FIG. 16. The oriented nickel-iron strip of FIG. 18 provides excellent directivity, but the spectrum is in the 1.5–1.7 mev. range and as such its primary applications would be in physics. Finally the use of uranium in a matrix provides a good spectrum and good directivity although the directional over-all efficiency is low.

It will be seen that FIG. 18 offers applications in the use of a magnetic force to modulate the direction and/or the polarity of the X-ray beam. An accelerator at these energy levels must be too massive to move rapidly on a circular path, but within a narrow limit the scan beam can be magnetically deflected. For widespread use this technique will depend upon improvement of design in mosaic receivers as the image intensifier screens.

Before going on to examine the nature of the shadowgraph information, and how it is stored, manipulated and displayed, let us consider the characteristics of magnetic tapes. The trend towards image intensified—orthicon (TV) camera—(TV) tape storage has been noted. Hospitals find storage of film records in lead screens a nuisance.

Now the "flood" of X-ray approach means a certain amount of distortion, and high cost in the recording chain. That is, the brief intensifier image is stored as a charge on the image plate of the camera (orthicon) tube. A scanning beam in this tube changes this pattern into a time-variant voltage.

First, the cost of magnetic tape and its write-read equipment is directly related to bandwidth. Thus, for example, a FRI 300 with loop and 300 kc. band costs $10,000 while a four megacycle band can go to $90,000. Then the "flood" method involves at least video bandwidth; where the lowest price is about $15,000. More important, the video tape costs about $90 for a reel, as opposed to $20 per reel for 300 kc. tape.

Second, there is more distortion in the receiving channel due not only to bandwidth but to the extra stage (the camera tube) needed before aiming at voltage signals for tape recording. Thus the net non-linearity of the camera response (due to charge leakage, etc.) is termed "gamma," and adds to distortion.

Finaly, the "flood" method does not admit of the magnification and stereoscopic effects which can be introduced using a circular beam scan. Conventional X-ray units involve bombarding a high density material such as molybdenum which will cause a broad cone or flood of X-rays having a variety of energy levels.

The concept of scanning an electron beam across a target material to produce X-rays is not practical for reasons of efficiency; a reasonable beam could not be formed. Then given a transmitter of small mass which moves with the origin of the beam, the first requisite is that the origin move with a constant velocity so that the tape can record coninuously with no distortion, and so that high scan rates can be achieved with small motivating power. Hence a circular scan.

In FIG. 22 there is a view of such a scan showing a transmitter 194 in a horizontal orbit 196, and a receiver 198 in a parallel orbit 200 below a body 202. A plan view (from the top) is given in FIG. 23. It can be seen from FIG. 23 that on each circle of the transmitter the vertical beam cuts the body in an arc; and thus, with horizontal body movement, a "raster" or picture is developed. This picture when taken from the tape to a cathode ray tube will be identical to the usual "flat" picture which the flood method yields.

There are two points of interest here. First, the cathode ray tube deflecting voltages will not be of the usual "sawtooth" (triangular) shape; but will be parts of sine waves, as shown in FIG. 24. Here part 204 of horizontal deflection 206 is used, and part 208 of vertical deflection 210. This will give the necessary arc to the tracing beam. The drive mechanism in this case FIG. 23 may seem to be simpler than that where the body lies within the scanning plane, FIG. 1. However, the receiver 198 has to be kept in line with the beam, and thus either two separate synchronous motors for 196 and 200, with servo to keep synchronism and long strip receivers to take care of angular error; or else a mechanical (outside) linkage between the transmitter 194 and the receiver 198.

Secondly, the rate of longitudinal body movement depends upon the revs./sec. of the transmitter and the number of beams in the ribbon. A typical low rate corresponds to 5 r.p.s. and 10 beams (1 per track on a 1 inch tape) of 0.01 inch diameter. This gives a rate of 0.5 inch/sec., in the upper limit. During these exposure periods, if the body be alive, the organs will move a bit. In a "flood" technique these movements (say, over 0.5 second) show as a blur of the outline. In the beam scan system each point on the outline is scanned in a very brief time; there is thus no blurring, but rather an outline which is curved to show minimum and maximum positions. For example, a heart muscle, when not at rest (diastasis), may be moving at 2.0 cm. per second; and the minimum and maximum volume will be shown by a scan picture.

The roentgen dose to the body (patient) is much reduced over the flood method. First, the X-rays, due to the electron orbit, emerge as pulses lasting a fraction of a microsecond with a period between pulses 20 to 30 times the pulse duration. This will still give the maximum resolution which the eye can resolve or the cathode ray tube reproduce (say, 300 to 500 lines at 70% modulation). Second, the crystal detectors in the receiver are more sensitive than the screen of an image intensifier. They have no storage or decay time problem and in theory can detect each quanta of X-ray. Third, a "flood" of X-ray, even when grid collimated, gives incident rays to the body at an angle to those desired.

In FIG. 25 there is shown the effective magnification due to a scan encircling a body 16; this effect has to be tied in with the description of the stereoscopic image given in FIG. 28.

A body sector 212 is to be examined. As the transmitter passes from 10 to 10′, the scanning beam goes from 20 to 20′. A detail 214 of a certain width has been placed at a large radius from the scan center 14, and a detail of the same width 216 at a small radius. Then FIG. 26(a) shows the received signal due to these details, with dark shading representing absorption. It is evident that the detail 216 close to the center gives a signal of long duration 216(e), and the detail 214 further away from centre gives a short period signal 214(L).

In FIG. 27(a) there is given the response of an electronic filter, where 218 represents signal strength and 220 frequency measured on the X axis. The slow cut-off of 222 gives the signal (image) of FIG. 26(b), where it is seen that the large radius detail 214 is now less pronounced 214(m). The filter characteristic of FIG. 27(b) is one of equal response 224 until cut-off frequency of 214 signal is higher than cut-off; and so 214(h) disappears. The net effect is thus one of giving the examiner the option of eliminating distracting detail whenever he wishes to concentrate on a volume near the scanning centre. The filters are located in the system either following the receiver or are introduced at a later stage on the tape readout amplifier. It is then obvious that the higher rates of rotation (i.e. a larger radii) giving higher frequencies will be removed and the low frequency information at the focal point will be emphasized.

In FIG. 28(a) there is given one possible pattern of information on the magnetic tape. The salient points of storage and display are:

(1) The X-ray image (shadowgraph) is "written' once only upon the stage. This image has to be then continuously "read" onto the cathode ray tube viewing screen.

(2) The image is not a changing one, so that the raster (image) rate at the screen may be lower than the television case. That is, a long persistence phosphor.

(3) The dark-adapted eye, where the rods are dominant, has a threshold of about one quanta times two rods times 20 milliseconds. Acuity is low at this level, for example only at three times threshold does the hand resolve itself into fingers.

(4) While the eye material (rhodopson) has a decay time in milliseconds the retina loop response may run to one-quarter of a second.

(5) In a recent thesis Massa of the Massachusetts Institute of Technology measured the information rate capacity of the eye. For example, with 10 elements he obtained about 16 "bits" (information) per 125 milliseconds.

(6) The visual loop is able to amplify contrast in an image, but the initial image is limited to three orders of density (exposure to X-ray of film, etc.). The visual response is to the logarithm of opacity. The recording response of photofluorescent systems is distorted by the successive "gammas" (non-linear sensitivity) in the chain; especially at the "toe" (lower end.)

Let the scan rate be 50 rev./sec., that is a "sector" rate of 400, and a maximum bit rate of 100 kc. A seven beam ribbon then completes a shadowgraph in about one second. If we allow four seconds (lower r.p.s.) then the bit rate goes to 25 kc. (kilocycles).

Considering factors (2) to (5) above we wish to "write" the cathode ray tube image at about ten times per second. In order to write over and over (factor (1)) and to increase the original information rate the tape image may be "written" onto a storage tube, as the C73959 or CK7702. It can then be read out at a higher multiple of the scanning rate, to give the final visual image. Alternatively the tape information (image) may be speeded up and repeated by placing this information on a tape loop which is running at a multiple of the original inches per second.

The feature of note here is the relatively low info-rate (bandwidth) on the first tape, making for low storage cost (as discussed) and ease of manipulation. For example the resolution of a storage tube varies inversely with the writing speed; hence lower info-rates fed in give a better picture. Also (reference-factor (6)) at lower frequencies it is easier to electrically amplify a narrow range within the full response of "tones" (opacity).

Finally, an examination for small "differences" is facilitated, as signal subtraction from another signal is less of a problem at low information rates. For example, signal one (shadowgraph) may be of a patient's kidney region today, and signal two the same kidney two months ago.

Returning to FIG. 28 the sector of interest 212 is traversed by a seven-beam "ribbon" which is sensed by the receiver 18. A tape 228 has eight channels 230 thru 244 and is moving in direction 246. Channel ("track") 230 is reserved for pulse markers from 248, occurring once per sector, and with a double mark each revolution. These pulse markers, which are written on the tape, serve to trigger each television horizontal line (or group of eight lines). The sweep rate corresponds to the inches per second setting on the tape readout. Thus during "record" (a scan period of one or two seconds) a head 250 is writing seven channels at the same time. Following "record," the channels may be read out one at a time as shown by the lower portion of FIG. 28. Here channel 232 is read by head 250 during one sector time; following which head 252 reads channel 234 for another sector time. Since only one or two selected sectors are viewed at any examination, all of the original seven parallel (sector) information blocks 232 thru 244 are read and there is one spare sector time before the next seven blocks are ready. If the tape 228 information be transferred to a loop tape as shown at 254 in FIG. 28(b) the read image will repeat itself, as required by the cathode ray tube. The price paid here is the need for the eight heads (each of eight tracks) in place of one.

While the circular scan in a plane above the body (FIG. 22) obviously gives a shadowgraph identical to that of older methods, it may be objected to that if the scan encircle the body (as in FIG. 1), then the shadowgraph may contain more information but is no longer familiar. Then FIG. 28 gives the way in which the familiar image is presented; with the added features of the "bringing out" (magnification) of an inner volume, and an apparent (stereoscopic) depth to the image.

Radiologists today attempt to "bring out" internal planes by simultaneous movement of the "flood" transmitter and receiving plane such that the internal plane is the only one to remain in focus—but this is not an ideal solution, no magnification for one thing. For another, no impression of depth.

In FIG. 29 there is a light-tight box 256, such that a pair of eyes 258, 266 are dark-adapted. Now, it is well-known that each eye receives a separate image, and, dependent on focus, these images are combined by the visual response to obtain a depth impression. Detail outside of the focus region is largely discarded by this response (by the well-known trick of focusing on a pencil at the tip of the nose—and then elsewhere). In FIG. 29 the X-ray scan does just this, projects a separate image to each eye, image 262 to eye 258, and, on the right, image 264 to eye 260. A screen 266 blocks any image or sight crossover. Beams 268 and 270 act just as light-rope in their focus effect, 270 signal gives 262, and 268 gives 264. And it is evident that 270 beam is nothing but 268 beam displaced by a small angle (say 45°), i.e. displaced in time on the tape record. For the best stereo effect the circular scan is made elliptical, such that an axis 272 is about one quarter more than an axis 274 in length. Separate images 262 and 264 appear on separate television tubes with each of two images corresponding to a different angle of viewing as the human eye does. These images appear on the two video tubes and are generated by the magnetic tape. The different angle of viewing is due to a small time displacement as the scanning beam rotates. Horizontal synchronizing signals are written as pulse markers on the tape.

Having thus described the invention what I claim and desire to obtain by Letters Patent of the United States is:

1. Apparatus for producing an image of an object within a body, comprising
   (a) an X-ray source,
   (b) an X-ray receiver disposed oppositely said source,
   (c) means for mounting said source and receiver for rotation in unison about an axis while operating said source and receiver,
   (d) means for moving said body between said source and said receiver as said source and receiver rotate to produce a helical scanning motion with respect to said body,
   (e) said receiver being adapted to convert the X-rays received from said source into electrical signals,
   (f) means for storing said signals, and
   (g) means for converting the stored signals into a visual display.

2. Apparatus according to claim 1 wherein said mounting means includes a fixed annular member and a movable annular member rotatably and concentrically mounted thereto, said movable member supporting said source and said receiver, and power means for continuously rotating said movable member about said fixed member.

3. Apparatus according to claim 1 wherein said source includes a radioactive element.

4. Apparatus according to claim 3 including means for collimating the rays from said element towards said receiver.

5. Apparatus according to claim 1 wherein said source includes a particle accelerator and a target adapted to produce X-rays upon impingement by accelerated particles.

6. Apparatus according to claim 1 wherein said signal converting means includes a video system.

7. Apparatus according to claim 1 wherein said storing means includes magnetic tape.

8. Apparatus for producing an image of an object within a body, comprising
   (a) a source of penetrating radiation,
   (b) a receiver disposed oppositely said source and adapted to respond to said radiation,
   (c) means for mounting said source and receiver for 360° rotation about an axis,
   (d) means for moving said body between said source and said receiver, while operating and rotating said source and receiver to generate a helical scanning with respect to said body,
   (e) said receiver being adapted to convert the radiation received from said source into electrical signals, and
   (f) means for converting said signals into a visual display.

9. Apparatus according to claim 8 wherein said mounting means includes a fixed annular member and a movable annular member rotatably and concentrically mounted thereto, said movable member supporting said source and said receiver, and power means for continuously rotating said movable member with respect to said fixed member about a horizontal axis.

10. Apparatus according to claim 8 wherein said source includes a radioactive element and a crystal adapted to generate X-rays upon impingement of energy from said element.

11. Apparatus according to claim 10 including shielding means for forming a narrow beam of rays from said element towards said receiver.

12. Apparatus according to claim 10 wherein said receiver includes scintillation material and photo multiplying means.

13. Apparatus according to claim 8 including an R.F. link between said receiver and said signal converting means.

14. Apparatus for producing an image of an object within a body, comprising
  (a) a source of penetrating radiation,
  (b) a receiver disposed oppositely said source adapted to respond to said radiation,
  (c) means for mounting said source and receiver for rotation about an axis,
  (d) means for moving said body between said source and said receiver,
  (e) said receiver being adapted to convert the radiation received from said source into electrical signals,
  (f) means for converting said signals into a visual display,
  (g) said signal converting means including a video system having a cathode ray oscilloscope with vertical and horizontal deflection plates responsive to signals from said receiver,
  (h) the horizontal deflection signals being synchronized with the rotation of said source and said receiver and the vertical deflection signals being synchronized with the movement of said body.

15. Apparatus for magnifying an internal volume of a body, comprising
  (a) an X-ray transmitter adapted to move angularly about said body,
  (b) an X-ray receiver positioned oppositely said transmitter,
  (c) said receiver being adapted to produce electrical signals in response to said X-rays,
  (d) the tangential scanning rate of the X-ray beam being relatively slow for a volume lying close to the axis of transmitter movement in relation to a volume at a distance from said axis whereby said receiver will produce a relatively low frequency signal for the volume close to said axis,
  (e) electrical filtering means for selecting said low frequency signal, and
  (f) means for converting said low frequency signal into a visual display.

16. Apparatus for producing a stereo image of an object within a body, comprising
  (a) an X-ray source,
  (b) an X-ray receiver disposed in spaced opposition to said source,
  (c) means for moving said body between said source and said receiver,
  (d) means mounting said source and receiver for angular movement about said body,
  (e) said receiver being adapted to convert the X-rays received from said source into electrical signals,
  (f) video means responsive to said signals for producing a visual display of said object,
  (g) said video means including double display means for producing separate images of said object, each of said images corresponding to different angular positions of said source and receiver with respect to said object, and
  (h) means for optically superimposing said images to provide a stereoscopic presentation of said object.

17. Apparatus according to claim 16 including electrical filtering means for passing selected signals from said receiver to said video means.

References Cited

UNITED STATES PATENTS

| | | | |
|---|---|---|---|
| 2,818,510 | 12/1957 | Verse | 250—91 |
| 3,076,054 | 1/1963 | Simon | 178—6.5 |
| 3,101,407 | 8/1963 | Shipman | 250—71.5 |
| 3,281,598 | 10/1966 | Hollstein | 250—57 |

RALPH G. NILSON, *Primary Examiner.*

A. L. BIRCH, *Assistant Examiner.*

U.S. Cl. X.R.

250—52, 58; 61, 61.5